United States Patent [19]
Collins et al.

[11] Patent Number: 4,477,750
[45] Date of Patent: Oct. 16, 1984

[54] MULTI-LEVEL DISK DRIVE MOTOR SPEED CONTROL

[75] Inventors: David W. Collins; John J. Neesz; Michael C. Stich, all of Rochester, Minn.

[73] Assignee: International Business Machines Corporation, Armonk, N.Y.

[21] Appl. No.: 378,968

[22] Filed: May 17, 1982

[51] Int. Cl.³ .............................................. H02P 1/22
[52] U.S. Cl. ....................................... 318/270; 318/4; 318/397
[58] Field of Search ............... 318/3, 4, 392, 396–398, 318/602, 603, 615, 616, 617, 618, 590, 592, 594, 301, 270, 385, 567; 364/160, 180, 182; 360/73, 74.1, 84

[56] References Cited
U.S. PATENT DOCUMENTS

| | | | |
|---|---|---|---|
| 3,309,597 | 3/1967 | Gabor et al. | 318/396 X |
| 3,665,172 | 5/1972 | Spaargaren et al. | 364/180 |
| 3,836,833 | 9/1974 | Harris et al. | 318/270 |
| 4,146,910 | 3/1979 | Oliver et al. | 360/73 X |
| 4,250,438 | 2/1981 | Onoda | 364/174 X |
| 4,302,785 | 11/1981 | Mussatt | 360/74.1 X |

*Primary Examiner*—Ulysses Weldon
*Attorney, Agent, or Firm*—Robert W. Lahtinen

[57] ABSTRACT

A three level motor speed control for a device such as a magnetic disk drive requiring a closely regulated running speed provides for acceleration, deceleration, obtaining close speed regulation and maintaining speed regulation of a rotating device during operation. The first level control provides acceleration or deceleration while checking velocity each eighth revolution and the second level control uses single revolutions to measure speed over an accurate rotational distance to obtain close speed regulation. Both level one and level two are controlled by the device controller. During run conditions with no error signal, a third level of control of the closely regulated velocity is maintained by separate hardware circuits which frees the processor for other uses. An error condition forces control to level one for re-establishment of the regulated running speed and a command to stop the drive forces control to level one for deceleration and stop procedures.

6 Claims, 8 Drawing Figures

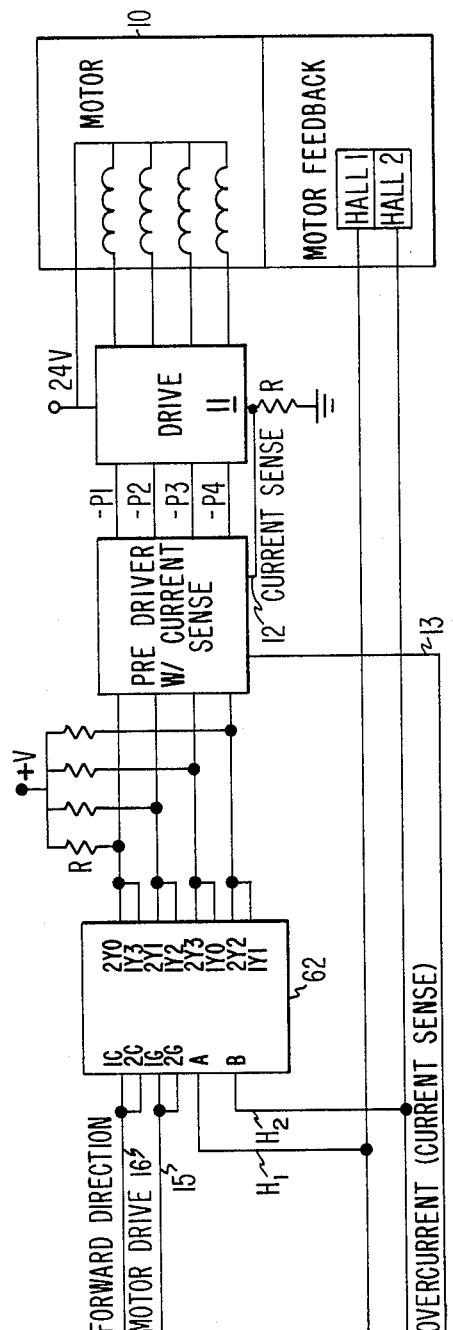
FIG. 1
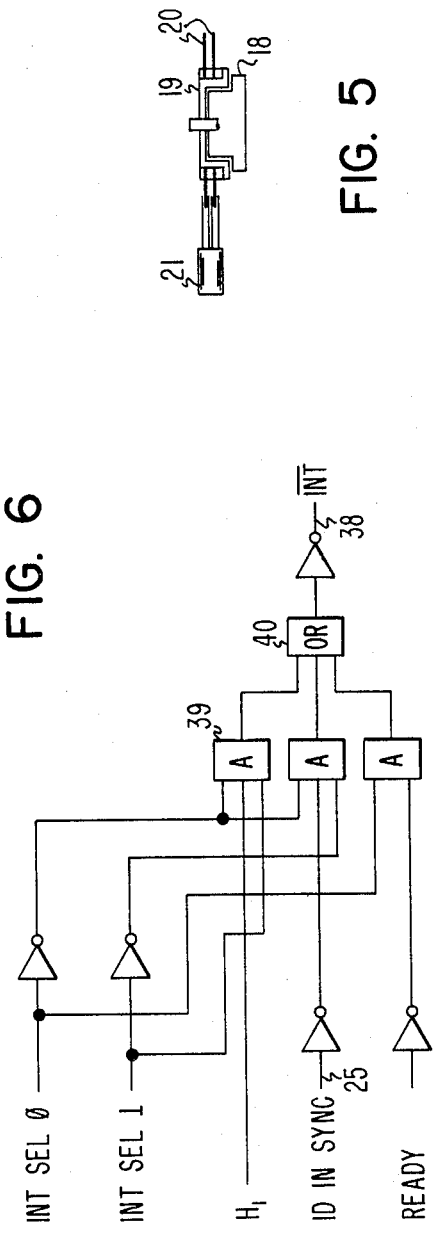
FIG. 5
FIG. 6

MULTI-LEVEL DISK DRIVE MOTOR SPEED CONTROL

BACKGROUND OF THE INVENTION

This invention relates generally to information storage disk drives and more particularly to apparatus for controlling the speed of rotation of information storage disk drives.

In a magnetic disk drive several parameters are dependent on closely regulating the media rotational speed. Among these are the data rate, the ability of the transducers to read and write data from and to the data sector areas, the flying characteristics of the transducer carrying slider that is supported above the media surface on a film of air and in those devices wherein air circulation is established or influenced by the rotating assembly, the airflow rate and effectiveness of purging of particulate matter from the media surfaces.

SUMMARY OF THE INVENTION

The motor speed control of the present invention proceeds from start to run through three modes of operation. In the initial mode two hall sensors spaced 45 degrees apart sense the flux changes induced by the passage of the four poles of the motor permanent magnet to generate a pulse each ⅛ revolution. The first and second modes of operation are controlled by a processor. In the first mode the processor uses an internal timer to measure the speed accurate to 6.4 microseconds per ⅛ revolution. The ⅛ revolution is inaccurate due to hall sensor location and variation in the length of the permanent magnet poles which the sensors sense. To overcome such inherent inaccuracy, a second level of control is entered when full operating speed is achieved. In the second mode the speed is measured over a complete revolution to cause consecutive measurements to relate to an accurate, recurring rotational distance.

When a predetermined accuracy of speed regulation is achieved, the processor relinquishes primary control to a hardware circuit that forms the third level of speed control that is functional during device operation. In this mode the speed is measured over each sector which results in sensing the speed a plurality of times, often exceeding fifty, during each disk revolution. The scan circuits read unique pre-recorded portions that appear during each sector and the time is measured between sectors. If the speed during passage of one sector is equal to or greater than a predetermined value, no drive pulse is generated. If the speed is indicated to be below the predetermined value, a drive pulse is provided to the motor. Thus when the motor is sensed to be running slow during a sector a drive pulse is sent to the motor during the next subsequent sector and if the motor is sensed to be running fast during a sector, no drive pulse is sent to the motor and the motor is permitted to coast during the passage of the next subsequent sector. As long as no error condition occurs during the third mode of operation, the controller is free to perform other functions associated with device operation until a command to turn off the motor occurs, whereupon the processor returns to control level one, the first or initial mode of operation. During the operating condition or third mode controlled by the independent hardware circuits, the processor does sense the in sync indicator and causes an interrupt if the digital circuits of the third mode fall out of sync. If a motor problem does occur, control reverts to control level one to re-establish the correct speed.

When a stop command is received, the processor disables the digital logic of the third mode, running condition and switches to control level one. During deceleration, pulses are applied to the motor which provide a torque opposing the normal direction of rotation. The pulses occur each ⅛ revolution causing reduced braking power during reduced speeds to prevent reversing of the motor at very low speeds. When a threshold low rotational speed is reached, deceleration is terminated and the motor is allowed to coast to a stop.

It is an object of the invention to control rotational acceleration and regulate the speed of a motor and the associated disk media using the inherent counting and control capabilities of the device controller or data processor.

It is a further object of the invention to maintain operating speed regulation with independent hardware to free the controller to perform other disk drive operating tasks.

It is also an object of the invention to provide controlled deceleration and stopping of the motor on command and without permitting a motor winding current which exceeds a predetermined value.

BRIEF DESCRIPTION OF THE DRAWING

FIG. 1 is a schematic logic diagram of the commutator, driver circuits and motor winding circuits of a motor control incorporating the present invention.

FIG. 5 is a schematic showing of a motor disk assembly and a cooperating transducer positioning actuator.

FIG. 6 shows the interrupt select circuitry used in the three modes or levels of control.

DETAILED DESCRIPTION

Figure 2:
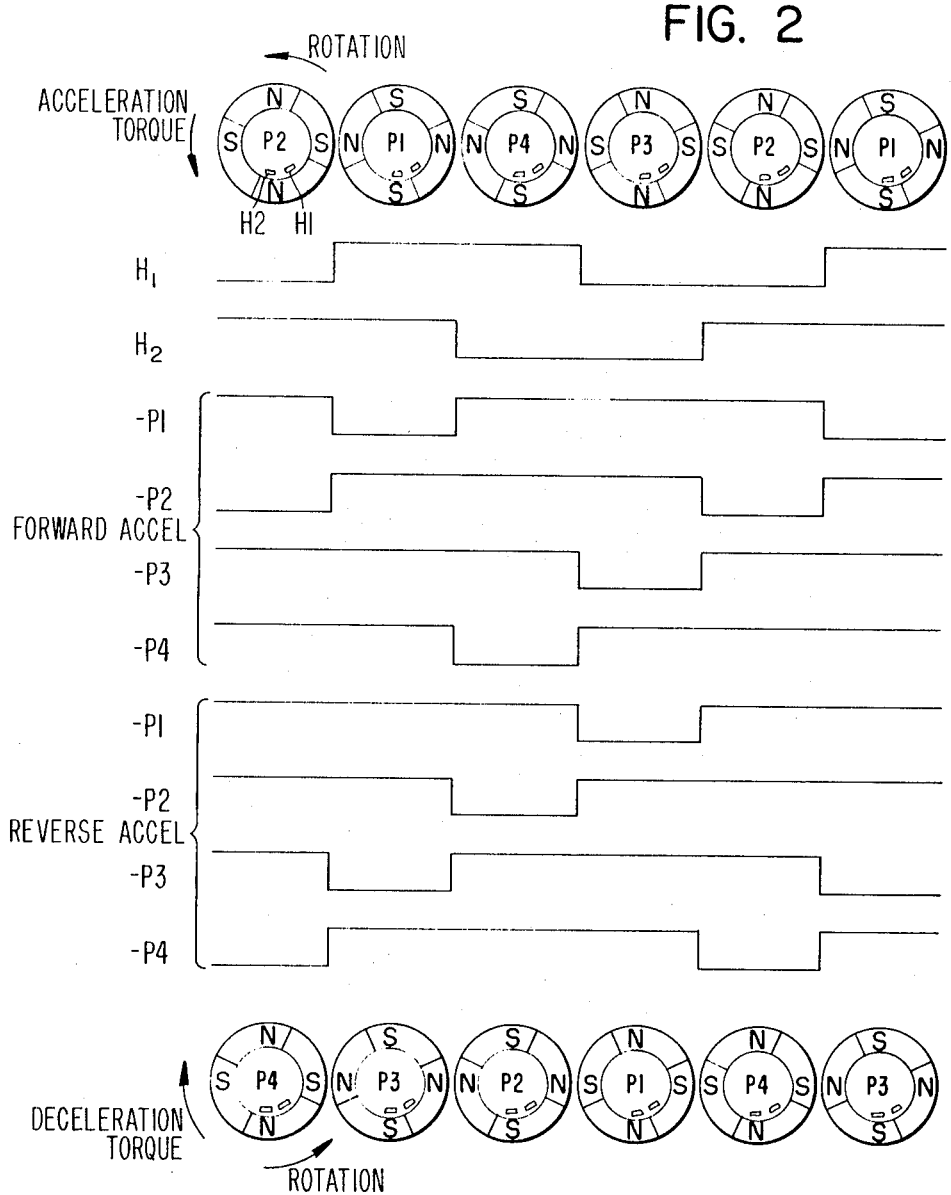
FIG. 2 is a timing diagram showing sensor output and winding sequences for both acceleration and deceleration.
Figures 3, 4:
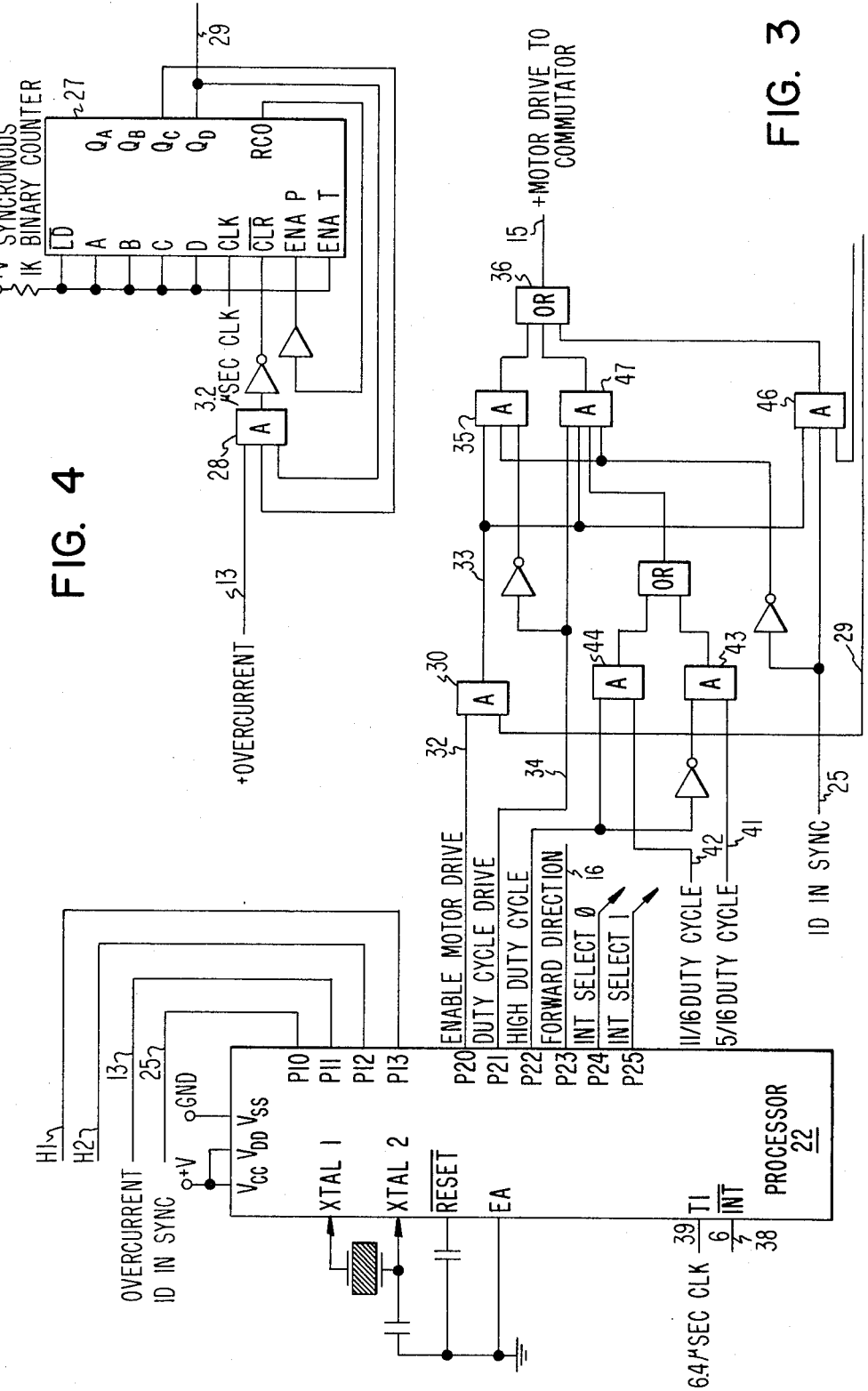
FIG. 3 is a logic diagram showing the device processor and the gating circuits for the three levels or modes of motor control.
FIG. 4 is the counter circuit for generating a 25 microsecond degating signal when an overcurrent condition is sensed.
Figure 7:
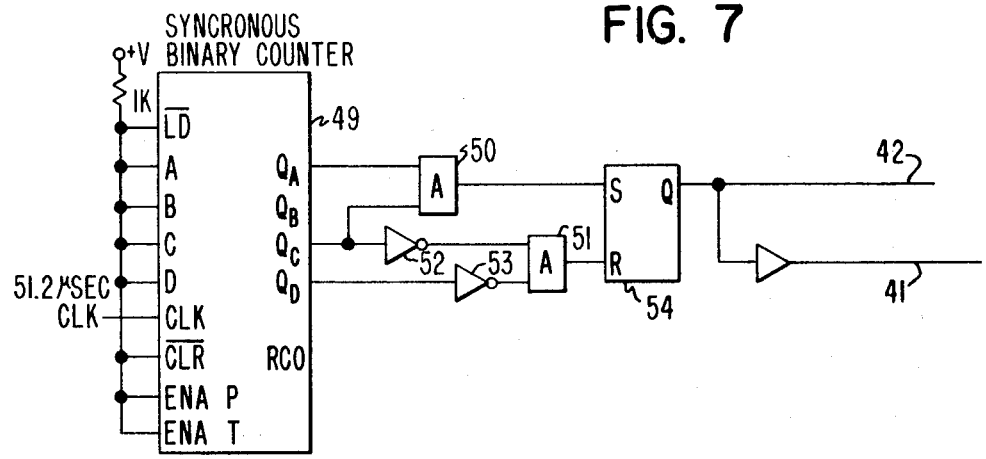
FIG. 7 is the counter and logic circuit for creating the high and low duty cycles used in mode or level two operation to obtain speed regulation.
Figure 8:
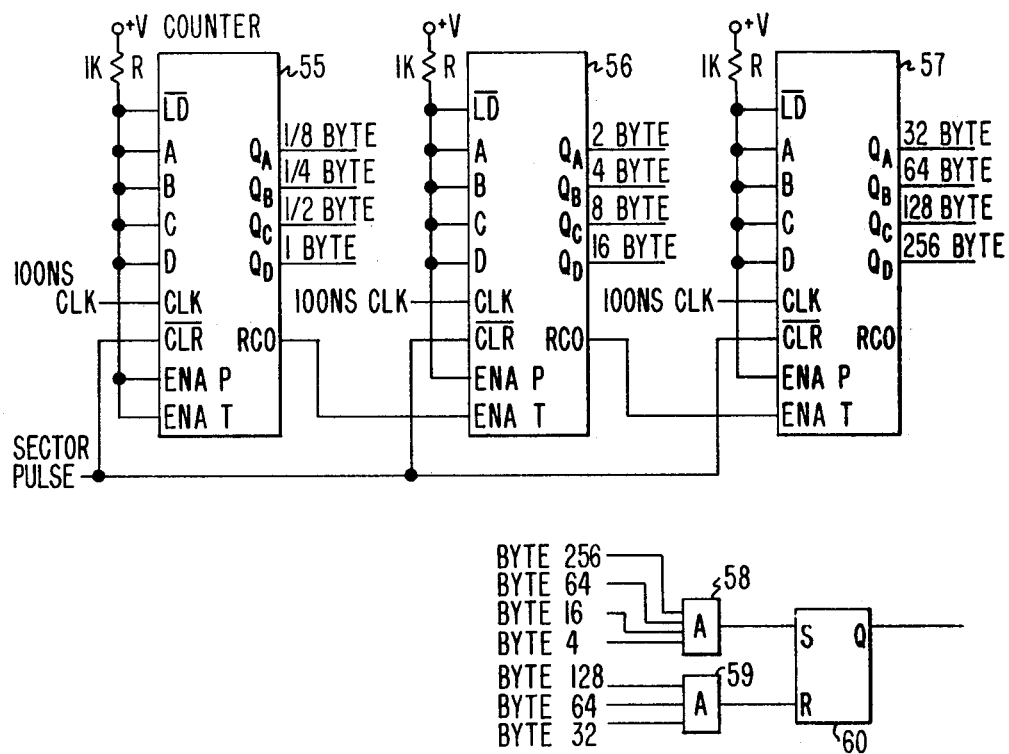
FIG. 8 shows the hardware counter and logic circuitry used to control the motor speed independent of the processor during the drive operating or running condition of mode or level three.

Referring to the drawings, FIG. 1 shows the general organization of the motor, driver and commutator circuits including the bifilar wound motor 10 having four phase windings identified as P1, P2, P3 and P4. A pair of hall effect sensors H1 and H2 are mounted on the motor stator at an angular spacing of 45 degrees from one another. The motor is driven by a 24 volt source through drive circuitry 11. Current is sensed on line 12 and produces an overcurrent signal 13 when a threshold value is exceeded. The commutator circuit receives input signals from hall sensors H1 and H2 which selectively gate the windings P1 through P4 sequentially one at a time as shown in the timing diagram of FIG. 2. A motor drive signal 15 is transmitted to the proper winding in accordance with hall sensor signals and the forward direction signal on line 16 which sequences the windings for either acceleration or deceleration as shown in the timing diagram of FIG. 2. FIG. 1 illustrates the commutator, predriver, drive and motor winding circuits associated with a disk file spindle drive of the disk drive assembly schematically shown in FIG. 5. FIG. 3 shows the processor and gating circuits for effecting the three levels of motor operation of the motor circuits of FIG. 1. The circuit of FIG. 4 generates the overcurrent interruption during all three levels of operation by degating the motor drive from the gating circuits of FIG. 3 from the motor circuits of FIG. 1 for a predetermined count or time period. FIG. 6 shows the interrupt circuitry including interrupt select bits that provides such functions as returning from the third level of operation hardware control to the first level operation processor control and the gating of sensor pulses during the second level of operation. FIG. 7 illustrates the logic that generates the high and low duty cycles used during the second level of operation gating of FIG. 3. FIG. 8 includes the counters and latch that use the sector pulses to control the speed regulation of the motor independent of the processor during the third level of operation which continues as long as the motor drive is enabled and the identifier field (ID) signals are in sync.

The motor 10 (FIG. 5) has a stator 18 and a rotor 19 on which are mounted one or more data disks 20 for unitary rotation with the motor. Information or data appears on the disks on concentric tracks which are accessed by transducers carried by a linear actuator 21 for radial accessing of the concentric tracks. Each track contains a plurality of sectors typically fifty or more that each include an identifier (ID) sector portion followed by a data sector portion. Each ID field has a pre-written pattern which identifies the presence of the sector.

FIG. 3 shows the processor 22 to which are connected hall sensor lines H1 and H2, the overcurrent digital signal on line 13 and a signal line 25 for indicating that the sector identifier (ID) fields are in sync. FIG. 4 shows the circuitry that receives overcurrent signal 13 (FIG. 1). The synchronous binary counter 27 receives the signal at AND 28 which causes the counter circuitry to have an output 29 for eight counts of a 3.2 microsecond clock to produce an approximate 25 microsecond pulse that degates the motor enable signal at AND 30 (FIG. 3). Thus a 25 microsecond interruption of power to the motor occurs when an overcurrent condition is sensed.

When the drive is started from a stopped condition, the enable motor drive 32 comes up to make signal 33 active at all times during use except when an overcurrent signal 29 causes a degating of AND 30. The duty cycle signal 34 is down and the ID in sync signal 25 is down to satisfy AND gate 35 and OR 36 to provide a continuous motor drive signal 15. This provides a continuous duty cycle except for interruption when an overcurrent condition is encountered. The 25 microsecond interruption when overcurrent is encountered allows coil current to drop well below the overcurrent condition. During this time the forward direction signal 16 is also active.

While in the initial operation mode, processor 22 senses the inputs on both hall sensors H1, H2 to measure the speed during each ⅛ revolution of the disk assembly. The internal interval timer measures speed during each ⅛ revolution accurate to 6.4 microseconds. These measurements are subject to errors due to tolerance in the hall sensor location and variation in the permanent magnet length which the devices sense.

When the interval between hall sensor transitions is equal to ⅛ the time required for a motor revolving at full speed, the processor switches to level two. In the second level of control processor 22 measures motor speed over a full revolution. This is done by using one sensor and using alternate appearances (since each hall sensor sees two full cycles of magnetization per revolution). One hall sensor is gated on line 38 to the processor by activating AND 39 and OR 40 of FIG. 6 during mode two operation when interrupt select zero is down and interrupt select one is up.

As seen in FIG. 7 a synchronous binary counter 49 has a 51.2 microsecond clock input. The four bit counter outputs are directed through AND gates 50, 51 and inverters 52, 53 to set the latch 54 at a count of five and reset the latch 54 when the counter overflows to zero. Accordingly latch 54 creates an 11/16 duty cycle 42 and a 5/16 duty cycle 41.

The processor 22 is interrupted by hall sensor H1 and causes the processor interval timer to be reset. Interval timer overflows are logged until 90% of a revolution at which time the interrupt is enabled for the next appearance of the hall sensor signal. After interrupt the interval timer and overflow register is compared to a nominal motor revolution period. If fast, control to the logic selects the low duty cycle 41 to enable gate 43 and allow motor 10 to slow down slightly. If slow, high duty cycle 42 is selected enabling gate 44 to slightly speed up the motor. If the measured motor speed is within a predetermined tolerance of the nominal value, the processor 22 enables a disk scan circuit to search for a pattern which is pre-recorded once per sector on the disk. When the search circuits synchronize to the once per sector pulses to produce an in sync signal 25, the third level of control is entered as gate 46 is enabled and gates 35 and 47 are disabled.

In the third level of operation the scan circuits lock onto the pre-recorded disk patterns bringing ID sync 25 to an up level. A counter circuit measures the time between sectors. In FIG. 8 counters 55, 56, 57 are driven by a 100 nanosecond clock and initialized by a sector pulse. Various outputs of the counters are connected to the AND gates 58, 59, as illustrated, to cause latch 60 to be reset at the 224 byte count and set at byte count 340. Whenever the first time exceeds the predetermined limit (340 bytes at 800 nanoseconds per byte or 272 microseconds) latch 60 is set and a drive pulse is gated to the motor through AND 46 (FIG. 3). If the disk assembly moves through a sector in less than 272 microseconds (340 byte counts) no drive pulse is generated during the subsequent sector. At this point the digital circuits of FIG. 8 replace the processor as the motor controller. The processor senses the in sync indicator and sets up the interrupt input, interrupt select zero and interrupt select one both down (FIG. 6) to be interrupted if the digital circuits of FIG. 8 fall out of sync.

The processor is now free to use 100% of its processing power to handle non-motor related items. The processor will be interrupted if a motor control problem occurs in the digital hardware. If such a problem occurs, processor 22 returns motor control to level one to restore the motor to the correct speed. If no error occurs, the motor remains under hardware control until a command is received to turn the motor off. The processor then returns to motor control level one.

To stop the disks, the processor disables the disk scanning logic forcing the hardware to lose control of the motor. Processor 22 switches to control level one with the reverse line active to commutator 62 (forward line 16 at a down level). This results in full current applied to the motor windings and lagging the rotation of the rotor to provide a torque opposing the normal direction of rotation. As in the starting sequence the motor drive signal is chopped by the circuit of FIG. 4 for approximately 25 microseconds at the occurrence of each overcurrent.

Processor 22, by using its interval timer, keeps the drive line active for up to 25 milliseconds following each hall sensor change. In this manner when the speed falls below 300 RPM the braking power is reduced to prevent the motor from reversing as it goes toward zero rotational velocity. For the same reason, motor current is stopped completely when the time between sensor changes exceeds 200 milliseconds. This allows the motor to coast to a stop from about 40 RPM.

While the invention has been particularly shown and described with respect to a preferred embodiment thereof, it will be understood by those skilled in the art that various changes in form and details may be made therein without departing from the spirit and scope of the invention.

What is claimed is:

1. In an information storage device including a rotating information carrying media, a motor for driving the rotating media and a processor unit, a motor drive control for regulating the rotational speed of the rotating media comprising:

first means for accelerating said information carrying media to an operating speed and effecting rotational speed regulation within a predetermined range under control of said processor unit;

digital circuit means for maintaining said information carrying media speed within a predetermined range of rotational velocities, whereby said processor unit is freed to handle non-motor related matters during no error operation; and sensing means for transferring motor drive control to said first means when an error condition occurs with respect to speed regulation effected by said digital circuit means.

2. In an information storage device wherein data is stored on a rotating media on concentric tracks divided into sectors, each of which has a prerecorded pattern, including a rotating information carrying media, a motor for driving the media and a processor unit, a motor drive control for regulating the speed of said rotating media connected to said motor comprising:

first means for accelerating said information carrying media to an operating speed and effecting rotational speed regulation within a predetermined range under control of said processor unit;

digital circuit means including counter means for generating a count between consecutive sector patterns for maintaining said rotating information carrying media speed within a predetermined range of rotational velocities, whereby said processor unit is freed to handle non-motor related matters during no error operation;

decode means responsive to the count generated between sector patterns; and output means that is actuated when said decode means determines that the rotational velocity of said rotating media is less than a predetermined value during the passage of the sector represented by said count.

3. The information storage device of claim 2 wherein said first means includes a first level wherein speed is measured by counting means within said processor unit a plurality of times during each revolution of said rotating media until a predetermined speed is attained; and a second level wherein rotational speed is determined by sensing rotation of said rotating media once per revolution until a predetermined range of speed regulation is achieved and further comprising switching means for transferring control of said motor from said first means to said digital circuit means when said predetermined range of speed regulation is achieved by said second level.

4. The information storage device of claim 3 further comprising error sensing means associated with said processor unit for sensing an error condition related to the rotating media speed regulation effected by said digital circuit means and for transferring control of said motor to said first means first level when an error condition is sensed.

5. The information storage device of claim 3 wherein said first means second level includes speed regulation means comprising a first motor duty cycle and a second motor duty cycle of longer duration than said first motor duty cycle and selection means for selecting said first motor duty cycle when the rotational velocity of said rotating media during one rotation exceeds a predetermined value and for selecting said second duty cycle when the rotational velocity of said rotating media during one revolution does not exceed said predetermined value.

6. The information storage device of claim 5 wherein said second motor duty cycle is at least twice the duration of said first motor duty cycle.

* * * * *